United States Patent
Fischer et al.

(10) Patent No.: US 6,567,826 B1
(45) Date of Patent: May 20, 2003

(54) METHOD AND SYSTEM FOR REPAIRING CORRUPT FILES AND RECOVERING DATA

(75) Inventors: Kevin J. Fischer, Redmond, WA (US); Robert W. Coffen, Redmond, WA (US); Eric Snyder, Bellevue, WA (US); Jeffrey Eric Larsson, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 221 days.

(21) Appl. No.: 09/602,457

(22) Filed: Jun. 23, 2000

(51) Int. Cl.[7] .............................................. G06F 17/30
(52) U.S. Cl. ........................... 707/202; 715/503; 714/2
(58) Field of Search ................................ 707/202, 204, 707/101, 503; 705/39, 400; 717/101; 713/200, 1, 165; 712/1; 709/315, 101; 703/6; 714/16, 20, 2; 702/182

(56) References Cited

U.S. PATENT DOCUMENTS

| | | | |
|---|---|---|---|
| 4,815,028 A | * 3/1989 | Saitoh | 714/20 |
| 5,021,995 A | * 6/1991 | Quint et al. | 707/101 |
| 5,964,885 A | * 10/1999 | Little et al. | 714/2 |
| 6,023,709 A | * 2/2000 | Anglin et al. | 707/204 |
| 6,292,810 B1 | * 9/2001 | Richards | 715/503 |

FOREIGN PATENT DOCUMENTS

JP            07105066 A   *  4/1995   ............ G06F/12/00

OTHER PUBLICATIONS

Bethoney, Herb, Office 98 Looks Like a Must for the MAC. (Microsoft's business application suite) (PC Week Labs) (software Review) (Evaluation), Jan. 1998, PC Week, v15, n1, p41 (2).*

* cited by examiner

Primary Examiner—Kim Vu
Assistant Examiner—Gwen Liang
(74) Attorney, Agent, or Firm—Merchant & Gould

(57) ABSTRACT

A method and system for loading files into a spreadsheet application program (SAP) operating on a computer system, using an escalating load sequence. The SAP determines if a normal load mode failed while attempting to load the files. In response to determining that the normal load mode failed, the SAP escalates the load sequence to a safe load mode, where a plurality of checks are performed and the files are repaired. The SAP also determines if the safe load mode was successful in repairing and loading the files. If the SAP determines that the safe load mode was unsuccessful, the SAP escalates the load sequence to a data recovery mode, where the spreadsheet application program attempts to extract formulas and values from the file.

23 Claims, 6 Drawing Sheets

METHOD AND SYSTEM FOR REPAIRING CORRUPT FILES AND RECOVERING DATA

TECHNICAL FIELD

This invention relates to the recovery of data from corrupt files. More particularly, this invention relates to a method and system for repairing corrupt files and recovering data, while the files are loaded into a spreadsheet application program.

BACKGROUND OF THE INVENTION

Files that users may attempt to load into spreadsheet application programs (SAP) can become corrupt for several reasons. These reasons include bugs in the SAP, bugs in other applications that can be used to edit files generated with the SAP, network connectivity problems, viruses, and anti-virus software. The corruption of a file may range from minor to severe data corruption. Furthermore, the file corruption may not be noticeable to the user, but the file corruption may cause specific features within the SAP to work improperly. The corruption may also cause loss of data or make it impossible for the user to open a SAP workbook.

In the past, users and product support personnel have used a number of methods for repairing files and recovering data. However these methods have many limitations. For example, a user can use a hex-editor to open the corrupt file and look for common problems. This method can be used to find problems like a missing end-of-file marker, but it cannot be used to recover data from a file with a corrupt OLE storage structure.

Furthermore, this method requires additional software (the hex editor), intimate knowledge of the SAP binary file format and knowledge of the common types of file corruption. Because of these technical hurdles, it is unlikely that users will successfully use this method.

Another method that is used to repair files and recover data involves saving the file in a different format and then re-opening the file in the SAP. The drawbacks to this method are that it is only useful if the workbook can be opened, and that it causes the loss of any data that is unsupported by the different format.

Yet another method that is used to repair files and recover data from corrupt files involves copying the content of the file to a new workbook. The drawbacks to this method are that it is only useful if the workbook can be opened and that it is a tedious and time consuming process to copy all the information from the corrupt workbook into a new workbook.

Still another method that is used to repair files and recover data from corrupt files involves importing the file into another application. Again, one of the drawbacks to this method is that it is only useful if the workbook can be opened. Another drawback to this method is that formulas, formatting, and other features within the file are normally lost.

In yet another method for repairing files and recovering corrupt data, the user utilizes a third party utility that generally only extracts data and does not save formatting, embedded objects, codes, etc. These third party utilities will recover some data, but they do not repair files or recover an extensive amount of data.

Thus, there is a need in the art for a spreadsheet application program that can repair corrupt files and is sufficiently robust to recover an extensive amount of data, including formulas, formatting, autofilters, charts, Visual Basic program modules, embedded objects, PivotTable reports, Query tables, and data validation.

There is a further need for a spreadsheet application program that can extract extensive amounts of data from corrupt files that cannot be opened.

There is yet a further need for a spreadsheet application program that incorporates file repair and data extraction, thereby eliminating the need for third party utilities.

SUMMARY OF THE INVENTION

The present invention satisfies the needs described above by providing a method and system for repairing and recovering data from corrupt files that are being loaded into a spreadsheet application program (SAP), such as Microsoft Excel®. More specifically, the present invention is a SAP that recovers and repairs corrupt files through the automatic escalation of three loading modes, whereby the SAP attempts to load the file in one mode, and if that mode fails it attempts to load the file in another mode, and if that mode fails it attempts to load the file in yet another mode.

In the first mode (normal load mode), the SAP opens files in a manner known to those skilled in the art. The SAP, in this mode, only conducts a few checks while opening a file. The SAP only performs checks that do not noticeably affect performance during file loading. As a result of the number of checks performed, undetected file corruption can cause the SAP to fail to open the file or crash. In other cases, normal load can open the file, but the user will see an error message or will be unable to use one or more features.

In the second mode (safe load mode), the SAP attempts to repair the corrupt file. While opening the file, the SAP performs numerous checks on the file. When corruption is detected that the SAP is able to repair, the file is altered. For example, the SAP may remove charts or PivotTable reports, rename sheets, or reset internal variables. In general, the SAP removes the parts of the file that are corrupt and then opens the remaining parts of the file that are intact.

In the third mode (recovery mode), the SAP attempts to read the table of cell values and formulas, but does not attempt to keep any other parts of the file. For example, the SAP may not recover formatting, charts, VBA code, and embedded objects. The data recovery mode is successful and of great benefit to users in cases where the file is too corrupt to be repaired or opened normally.

The data recovery mode is useful because the SAP files are often used to store large amounts of raw data. In some cases, data may be difficult or impossible to recreate, whereas the charts and formatting are generally easier to recreate if the underlying data is recovered. Therefore, extracting data and formulas from a corrupt file is a benefit to the user and can prevent a complete loss of the contents of a badly damaged file.

These and other features, advantages, and aspects of the present invention may be more clearly understood and appreciated from a review of the following detailed description of the disclosed embodiments and by reference to the appended drawings and claims.

DETAILED DESCRIPTION

Figure 1:
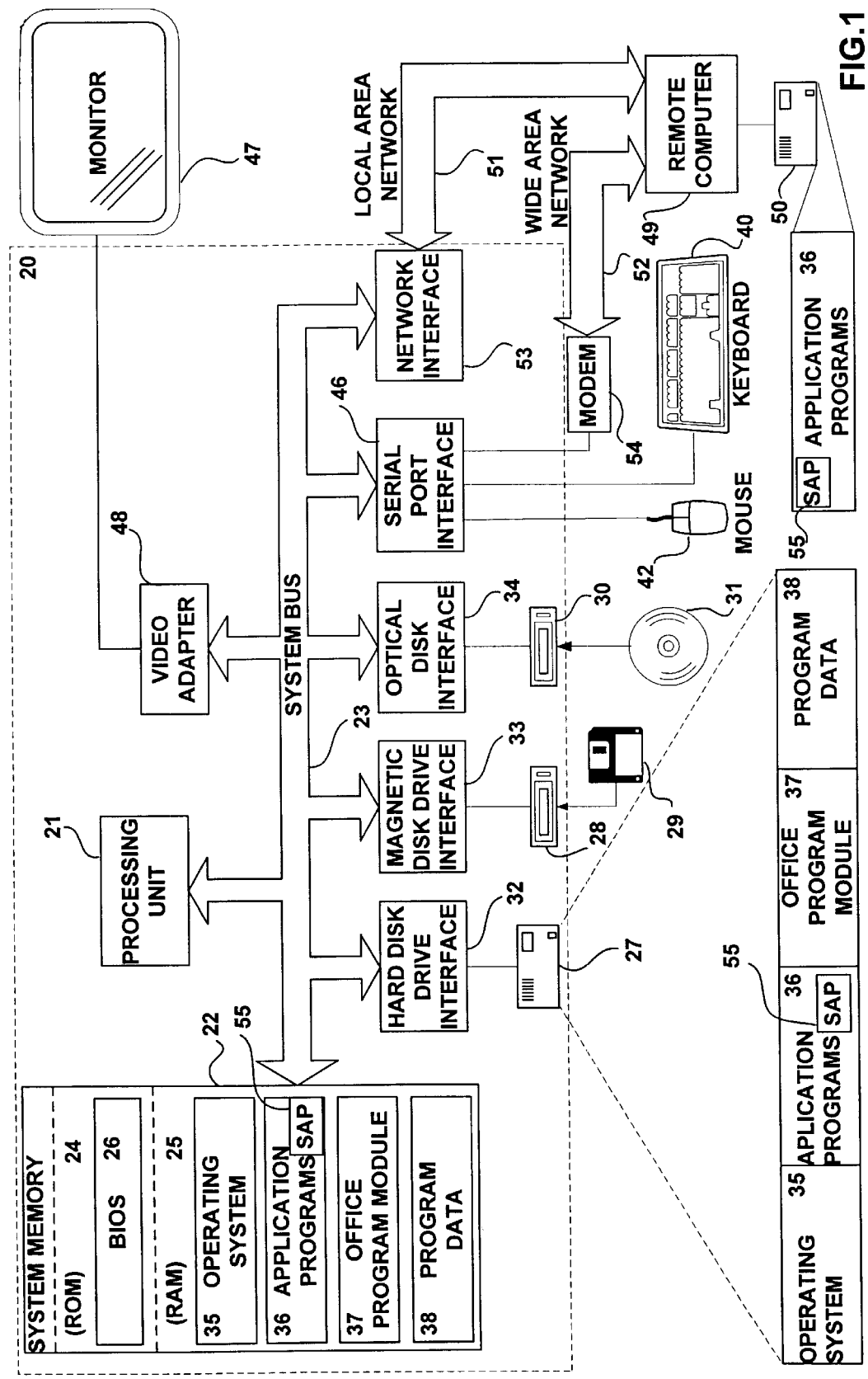
FIG. 1 is a block diagram of an exemplary computer system that provides an illustrative operating environment for the present invention.

The present invention is directed to a method and system for repairing and recovering data from corrupt files that may be loaded into a spreadsheet application program (SAP), such as Microsoft Excel. More specifically, the present invention is a SAP that recovers and repairs corrupted files through the automatic escalation of three modes, during the loading of SAP files.

In one embodiment, the invention is incorporated into the "OFFICE" program module, manufactured and sold by Microsoft Corporation of Redmond, Wash. Briefly described, the "OFFICE" program module is a suite of word processing, spreadsheet, presentation, database, and time management application programs along with program modules that integrate and enhance these application programs. While the invention will be described in the general context of the "OFFICE" program module running in conjunction with a personal computer, those skilled in the art will recognize that the invention also may be implemented in combination with other program modules.

Having briefly described an embodiment of the present invention, an illustrative operating environment for the present invention is described below.

Illustrative Operating Environment

Referring now to the drawings, in which like numerals represent like elements throughout the several figures, aspects of the present invention and the illustrative operating environment will be described.

FIG. 1 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an illustrative system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the illustrative operating environment.

A number of program modules may be stored in the drives and RAM 25, including an operating system 35, one or more application programs 36, an "OFFICE" program module 37, program data 38, and other program modules (not shown). The spreadsheet application program (SAP) 55 of the present invention is one of the application programs 36 that may be stored in the drives and RAM 25. SAP 55 comprises computer instructions for performing the methods of the invention described herein.

A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 55 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are illustrative and other means of establishing a communications link between the computers may be used.

System for Repairing Corrupt Files and Recovering Data

In one embodiment, the present invention is a system comprising a spreadsheet application program (SAP) 55 running on personal computer 20, and stored in drives (27 and 50) and RAM 25 of FIG. 1. The SAP 55 of the present invention recovers and repairs corrupt files through the automatic escalation of three loading modes.

In the first escalation mode (normal load mode), the SAP opens files in a manner known to those skilled in the art. The SAP, in this mode, only conducts a few checks while opening a file. The SAP 55 only performs checks that do not noticeably affect performance during file loading. As a result of the number of checks performed, undetected file corruption can cause the SAP 55 to fail to open the file or crash. In other cases, normal load can open the file, but the user will see an error message or will be unable to use one or more features.

In the second escalation mode (safe load mode), the SAP 55 attempts to repair the corrupt file. While opening the file, the SAP 55 performs numerous checks on the file. For example, the SAP 55 may check the file for workbook names, Active X controls, Visual Basic programs, macro viruses, record size, PivotTable report information, end of file marker, and invalid name range.

In conducting the above checks, the SAP 55 checks the workbook names to determine if the workbook names are valid. This is determined by checking if the name lengths are correct, the workbook names do not contain a null character, and there are no duplicate workbook names within the SAP's file. The SAP 55 checks the record size to determine if the record size is within a predetermined record size range. The SAP 55 also checks the PivotTable reports to determine if there is supporting record information in the file. Among the many other checks that are done on PivotTable reports are checks to determine if the field names are unique and whether the PivotTable reports do not overlap each other. PivotTable reports are used for dynamic cross-tabular analysis of database records. The source of the database records may be from a range of cells in a SAP worksheet or an external database which is stored in a Microsoft Access, or a Microsoft SQL Server, or an Oracle Server, etc. The SAP 55 may also make use of information gathered during the normal load mode to direct safe load mode. For example, if during normal load mode the SAP 55 detects corruption in a particular feature, it may use this information to ignore that corrupt feature while loading the file in safe load mode.

While conducting the checks, if the SAP 55 detects corruption that the SAP 55 is able to repair, the file corruption is either repaired or removed. For example, the SAP 55 may remove charts or PivotTable reports, rename workbooks, or reset internal variables. In general, the SAP 55 removes the parts of the file that are corrupt and then keep the remaining parts of the file that are intact.

In the third escalation mode (data recovery mode), the SAP 55 attempts to read the table of cell values and formulas, but does not attempt to keep any other parts of the file. For example, the SAP 55 may not recover formatting, charts, visual basic (VBA) code, embedded objects, PivotTable reports and other OLE streams. The SAP 55 provides the user with three options for controlling data recovery.

In the first option, if a formula contains an off-sheet reference or a reference to a named range and the SAP 55 cannot recover the complete formula; by default, the formula is converted to a value. The SAP 55 keeps as much of the formula as possible and uses "#REF" for unrecoverable references and "#Name" for unrecoverable name ranges. For example, the formula "MAX(A1, SomeNamedRange)" will either be converted to a numeric value or appear as "(MAX (A1, #NAME)". This option can be toggled by changing a particular setting in the registry database, or in the user interface (UI), when manually recovering a corrupt workbook. The UI will be discussed below in the section titled "Illustrative Implementations of the Method for Repairing Corrupt Files and Recovering Data."

In the second option, the SAP 55 assumes that the docfile structure is not corrupt. A docfile is an OLE structured storage file that is hierarchical and is analogous to a file system. The SAP 55 makes this assumption because records in the file that are not user data may appear to be data and be recovered, leaving the user with unusable data in the recovered workbook. However, to help recover workbooks that are badly damaged, there is a registry value that forces the SAP 55 to assume that the workbook has a corrupt docfile structure and extract data accordingly.

In the third option, the SAP 55 allows the users, through data recovery, to extract hidden data from protected workbooks. That is, workbooks that the user may have protected with a password or similar feature. These are not workbooks that have been encrypted.

While there are many other ways to defeat workbook protection, data recovery provides a much easier method of defeating workbook protection. Therefore, a registry option is provided so that a system administrator can use a policy editor to set a specific registry value and hide data recovery from the UI. However, safe load mode and automatic escalation to data recovery mode is always available, regardless of the registry setting if the user is attempting to open a corrupt file.

From the above description of the present invention, it can be appreciated by one of ordinary skill in the art that the present invention may be implemented with more or less modes of escalation. For example, it is possible that the present invention may be implemented with two modes of escalation. The SAP 55 may first attempt to open the file in normal load mode and then directly escalate to data recovery mode or the SAP 55 may attempt to open the file using only normal load mode and safe load mode.

Method for Repairing Corrupt Files and Recovering Data

Having described the system in accordance with an embodiment of the present invention, an illustrative method of carrying out the invention will be described in FIG. 2.

Figure 2A:
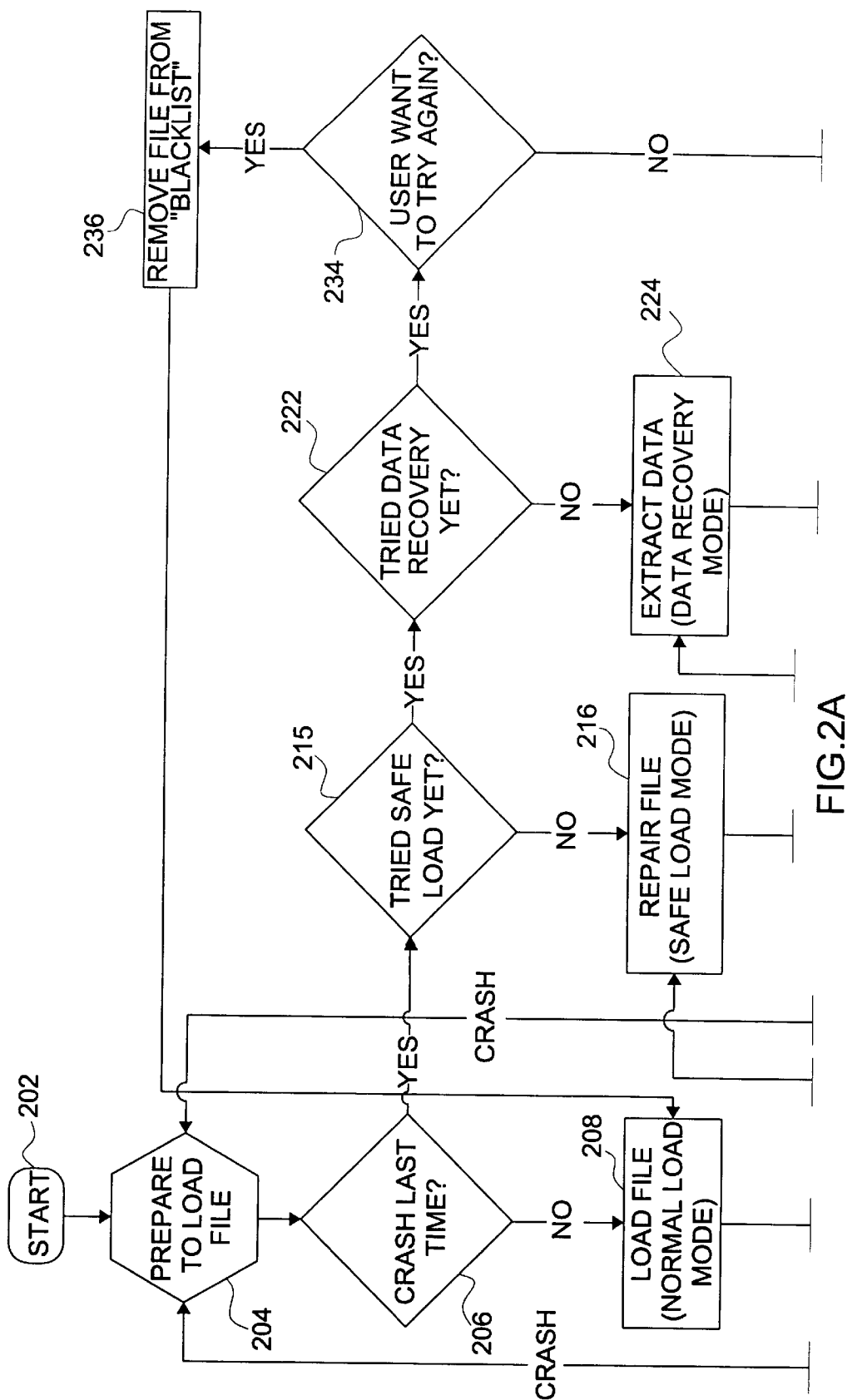
FIG. 2 is a flow diagram illustrating the file repair and data recovery method in accordance with an embodiment of the present invention.
Figure 2B:
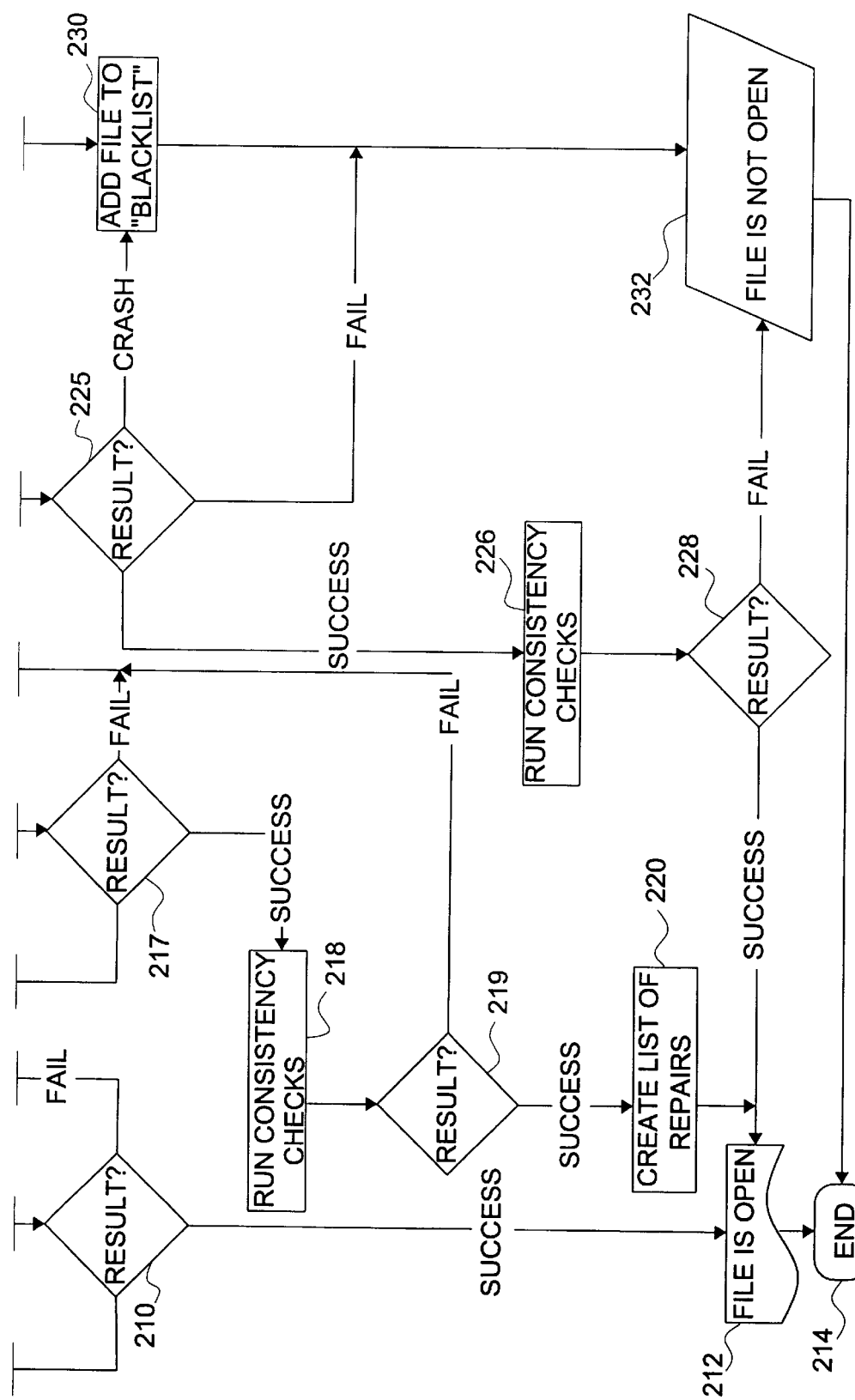

FIG. 2 is flow diagram showing an illustrative File Repair and Data Recovery Method 200. The method 200 begins at start step 202 and proceeds to step 204, where the SAP 55 (FIG. 1) prepares to load the file. Next, the method proceeds to step 206 and determines if the SAP 55 crashed the last time that the file was loaded. If at step 206, the SAP 55 determines that the SAP 55 did not crash the last time that the file was loaded, the method 200 proceeds to step 208. At step 208, the SAP 55 attempts to load the file using the normal load mode. The result of the normal load mode is analyzed at step 210.

If at step 210 the SAP 55 determines that the normal load is successful, the method 200 proceeds to step 212, where the file is opened. The method 200 then proceeds to step 214 and ends. However, if at step 210 the SAP 55 determines that the normal load failed, the method 200 returns to step 216 and restarts the load process.

Returning to step 206, if at step 206 the SAP 55 determines that SAP 55 crashed the last time that the file was loaded, the method proceeds to step 215. At step 215, the SAP 55 determines if the file has previously been loaded with safe load. If the SAP 55 has not previously loaded the file with safe load, the method 200 proceeds to step 216. The method 200 also proceeds to step 216 if at step 210 it is determined that the normal load failed. At step 216, the method 200 escalates the file load process to safe load mode.

Next, the method 200 proceeds to step 217, where the results of step 216 are analyzed. If at step 217 the SAP 55 determines that the SAP 55 crashed during safe load, the method 200 proceeds to step 204 and restarts the load process. However, if the method 200 at step 217 determines that the safe load successfully loaded the file, the method 200 proceeds to step 218. At step 218, the SAP 55 runs the consistency checks on the file. The method 200 analyzes the results of the consistency checks at step 219.

If at step 219 the SAP 55 determines that the consistency checks were successful, the method proceeds to step 220. At step 220, the SAP 55 creates a list of the repairs that were made to the file. Then, the method 200 proceeds to step 212, where the file is opened. The method 200, next, proceeds to step 214 and ends.

Returning to step 215, if at step 215 the SAP 55 determines that the file has previously been loaded with safe load, the method proceeds to step 222. At step 222, the SAP 55 determines if the file has been previously loaded with data recovery mode. If the file has not been previously loaded with data recovery mode, the method 200 proceeds to step 224. The method 200 also proceeds to step 224 from steps 217 and 219. At step 224, data is extracted from the file using data recovery mode.

Next, the method 200 proceeds to step 225, where the result of step 224 is analyzed. If at step 225 SAP 55 determines that the data recovery mode succeeded in recovering the data from the file, the method 200 proceeds to step 226. At step 226, the SAP 55 runs the consistency checks on the file. Then, the method 200 proceeds to step 228. At step 228, the SAP 55 analyzes the results from the consistency checks done on the file. If at step 228 the SAP 55 determines that the consistency check were successful, the method proceeds to step 212. At step 212, the file is opened. The method 200 then proceeds to step 214 and ends.

If at step 225 the SAP 55 determined that the data extraction using the data recovery mode crashed the SAP 55, the method proceeds to step 230. At step 230, the file is added to the "blacklist." The "blacklist" is a list of files that have been disabled and the SAP will not attempt to open again, unless the user explicit removes a file from the "blacklist." The method 200 then proceeds to step 232, where the file is not opened. Next, the method 200 proceeds to step 214 and ends.

If at step 225 the SAP 55 determined that the data extraction using the data recovery mode failed, the method proceeds to step 232, where the file is not opened. The method 200 then proceeds to step 214 and ends.

Returning to step 222, if the SAP 55 determines that the SAP 55 has already attempted data recovery, the method 200 will proceed to step 234. At step 234, the user must determine if another attempt should be made to open the file. If the user at step 234 determines that another attempt should not be made, the method 200 proceeds to step 230. At step 230, the file is added to the "blacklist." The method 200 then proceeds to step 232, where the file is not opened. Next, the method 200 proceeds to step 214 and ends.

If the user at step 234 determines that another attempt should be made to open the file, the method proceeds to step 208 and attempts to load the file using normal load mode.

Although the present invention has been described above as implemented in a preferred program module, it will be understood that alternative embodiments will become apparent to those skilled in the art to which the present invention pertains without departing from its spirit and scope. Accordingly, the scope of the present invention is defined by the appended claims rather than the foregoing description.

Figure 3A:
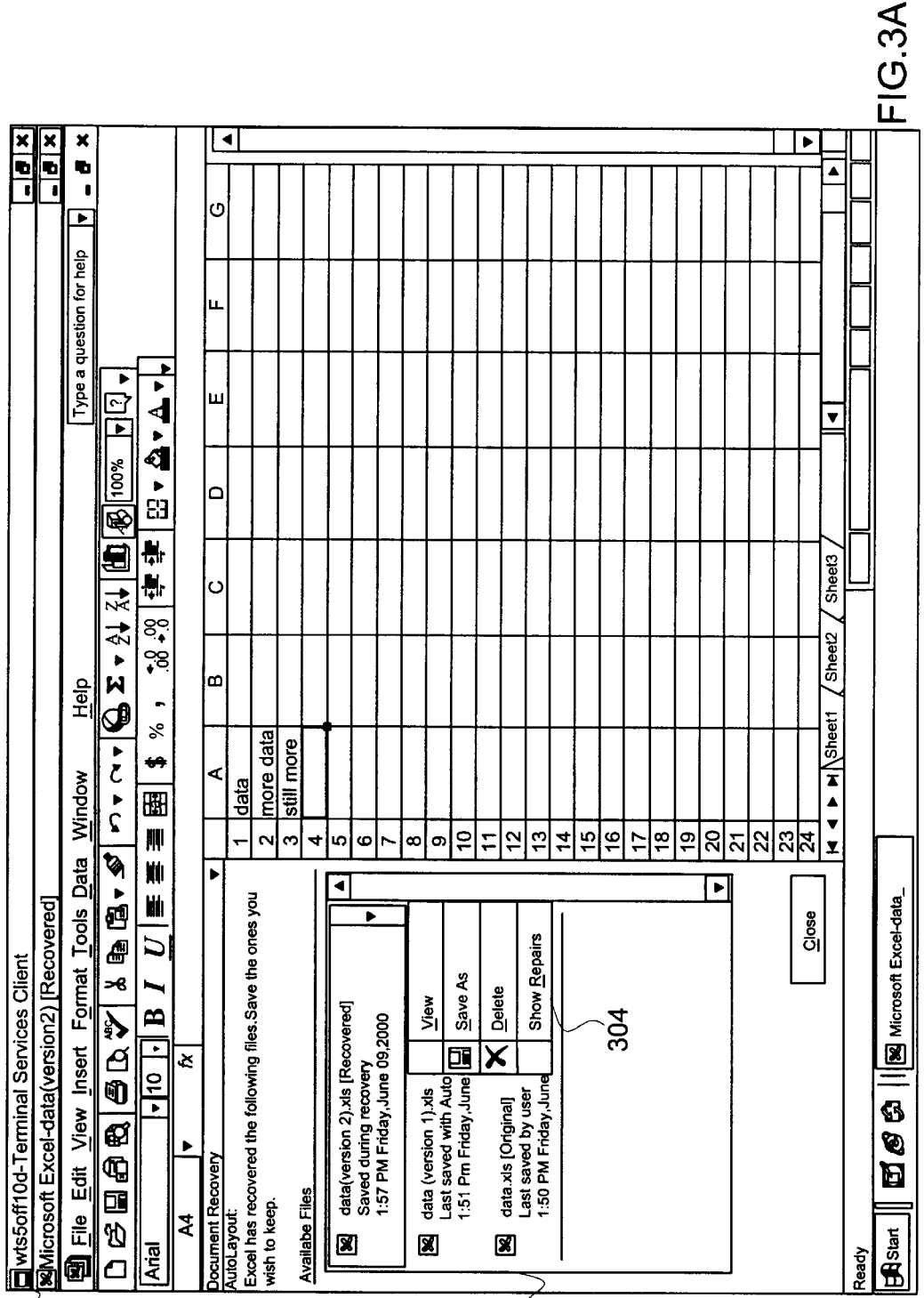
FIG. 3a is a screen shot illustrating an example of a recovery workpane of the present invention.

Illustrative Implementations of the Method for Repairing Corrupt Files and Recovering Data Spreadsheet Application Program Crash In one embodiment, the SAP 55 is the Microsoft Excel application program. In the case where Excel crashes and there are corrupt files to recover, a recovery workpane is invoked on the next boot of personal computer 20 (FIG. 1). An example of a recovery workpane 300 is illustrated in FIG. 3a. The recovery workpane 300 is a type of window, but the recovery workpane 300 can also be a dialog. In the present invention, the recovery workpane 300 is implemented as a modeless toolbar.

The recovery workpane 300 is invoked as long as the user does not terminate a crash recovery executable that is launched in response to the crash. This crash recover executable is launched to create and save a save-on-crash file for each of the files that were in use at the time of the crash.

After the crash and reboot, if there are corrupt files and save-on-crash files, they are listed in the recovery workpane 300. The files listed in the recovery workpane 300 have "repaired" appended to their name in the title bar 302 if they were corrupt files that were repaired (either via safe load mode or data recovery mode). If the files were not corrupt, they have "recovered" appended to their name in the title bar 302. The user, from the recovery workpane 300, can invoke a repair dialog by clicking on a link 304 in the recovery workpane 300 of each repaired file. The repair dialogs provide the user with information regarding the repairs made to the corrupt file. An example of a repair dialogs of the present invention is shown in FIG. 3b.

Figure 3B:
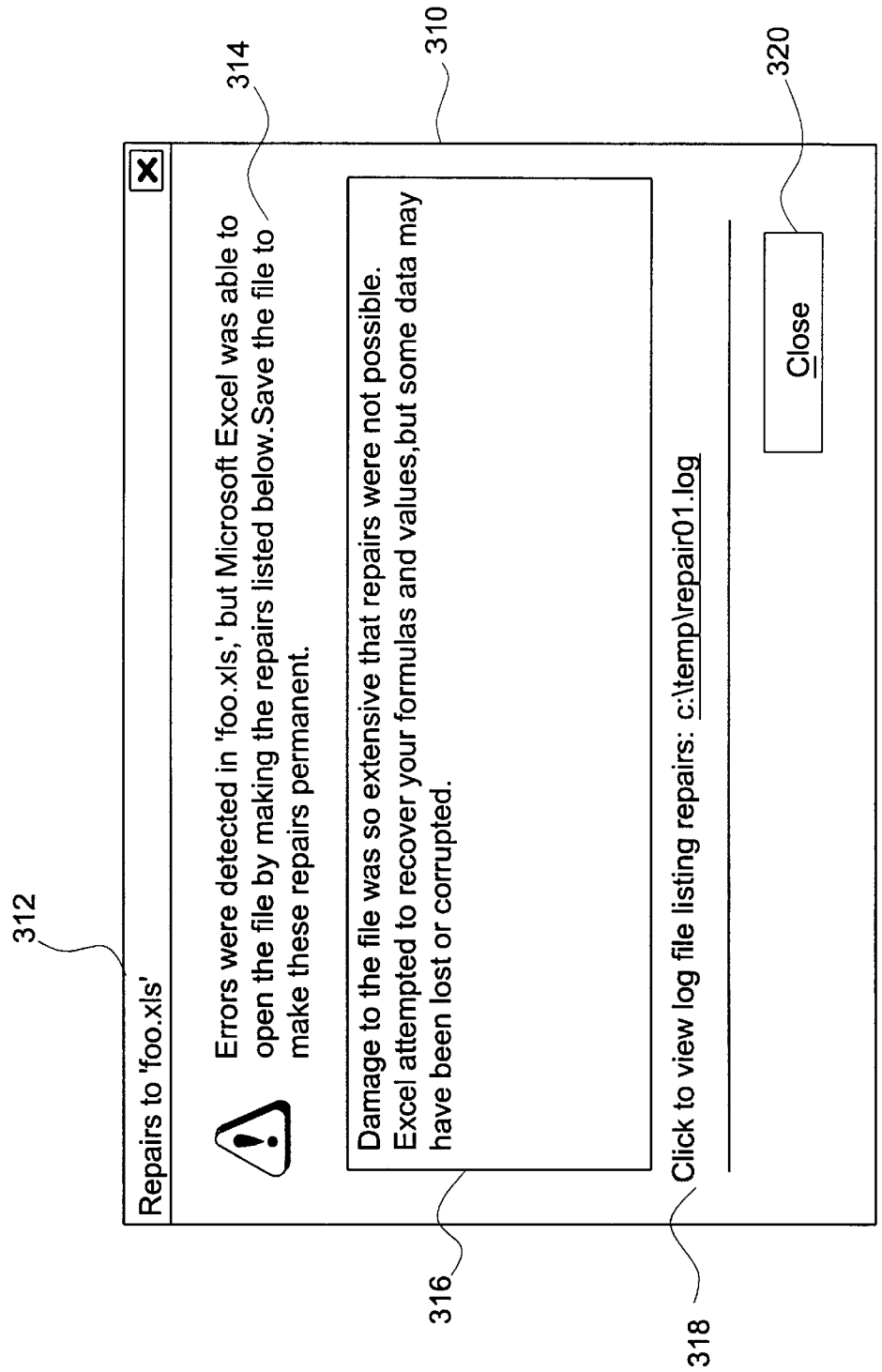
FIG. 3b is a screen shot illustrating an example of a file repair dialog of the present invention.

FIG. 3b illustrates the repair dialog 310 for file repair and data recovery. FIG. 3b provides the user with the file name 312, an error message 314, a repairs listing box 316, a clickable area 318, and a close button 320. The error message 314 is used to notify the user that errors were detected in the file and that the repairs (safe or data recovery mode) made to the file will be listed in the repairs listing box 316. The user is also directed, in error message 314, to save the file in order to make the repairs to the file permanent.

The clickable area 318 is used to link a log file to the repairs dialog 310. The clickable area 318 allows a user to open the log file in notepad or whatever editor is associated with the ".LOG" extension files. The log file, which is saved in a temporary folder, archives a copy of the errors that were detected in the file. The close button 320 enables the user to exit the repairs dialog 310.

Contrary to the case were there are corrupt files and save-on-crash files, if after the crash and reboot there are no associated save-on-crash files, the corrupt files are not listed in the recovery workpane, but are automatically re-opened after the crash.

In those cases, a repairs dialog 310 is automatically displayed when the file is opened. Repaired files that are not listed in the recovery workpane 300 have "repaired" appended to their name in the title bar 302.

No Spreadsheet Application Program Crash

A repairs dialog 310, as discussed above in conjunction with FIG. 3b, is displayed automatically if a file is opened with safe load or data recovery through the user interface (UI) or object model, or the SAP 55 successfully uses safe load or data recovery to open a corrupt file without crashing. The repaired files are not listed in the recovery workpane 300 if there was no crash prior to the file recovery. As in the crash example above, for files not listed in the recovery workpane 300, the filename is appended with "repaired" in the file title bar 302.

Figure 4:
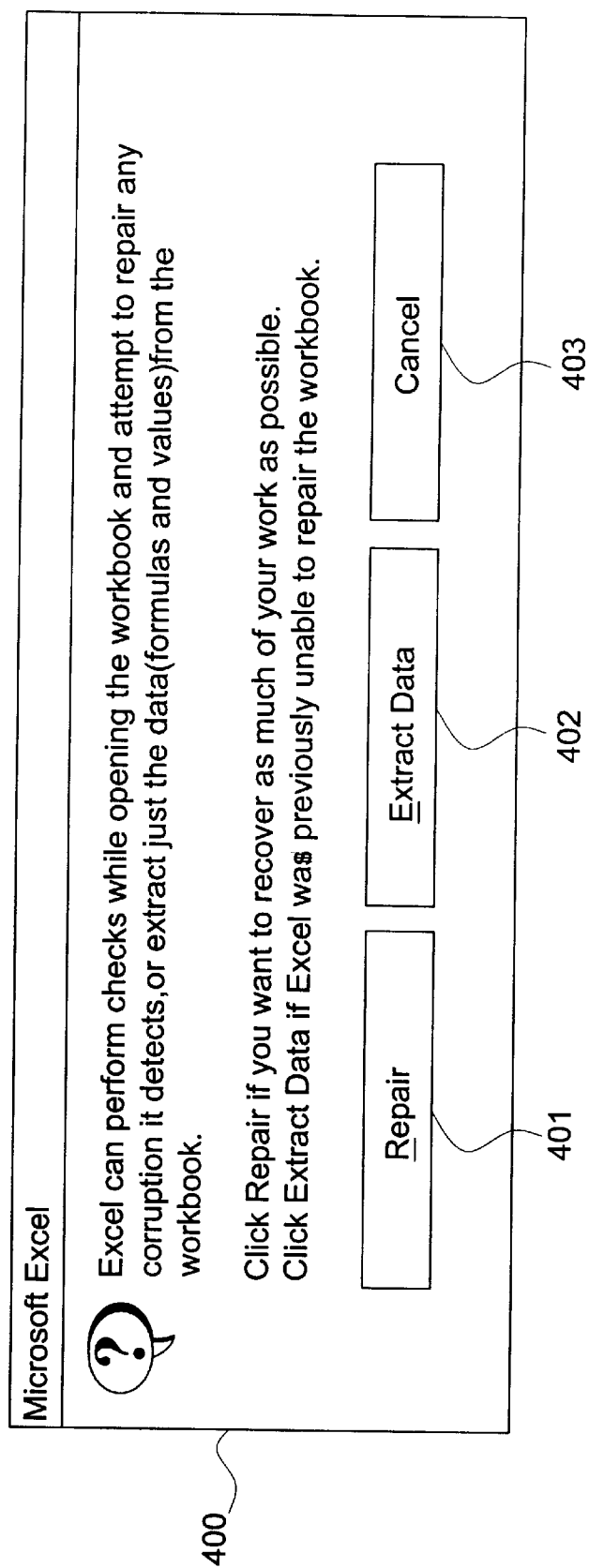
FIG. 4 is a screen shot illustrating an example of a repair mode alert dialog of the present invention.

The UI provided by the present invention allows the user through a file open dropdown menu to initiate the safe load and data recovery modes. Selecting a "open and Repair" option, in the file open dropdown menu, displays the repair mode alert dialog 400 of FIG. 4. Through the repairs mode alert dialog 400, the user can instruct the SAP 55 to initiate safe mode through repair button 401, data recovery mode through extract data 402, or the user can exit from the repairs mode alert dialog by selecting cancel button 403.

What is claimed is:

1. A method for repairing files and recovering data from corrupt files in an application program, the method comprising the steps of:
   starting to load a file into the application program using a first load mode, wherein the first load mode is a normal load mode; and
   in response to determining that the first load mode failed, automatically escalating the first load mode to a second load mode within the application program, wherein the second loal mode is a safe load mode for repairing the file, wherein the safe load mode comprises conducting a plurality of consistency checks on the file during the opening of the file, wherein the plurality of consistency checks include:
   Active X controls
   Visual Basic programs, and
   Pivot Table report information.

2. The method of claim 1, wherein in response to determining that the second load mode failed, automatically escalating the second load mode to a third load mode within the application program if the second load mode is the safe load mode.

3. The method of claim 2, wherein the third load mode is the data recovery mode.

4. The method of claim 2 further comprising the step of disabling the file if the third load mode is unsuccessful in loading the file.

5. The method of claim 2, wherein the third load mode comprises reading a table of cell values and formulas.

6. The method of claim 5 further comprising the step of attempting to recover a formula in its entirety and if that is unsuccessful converting the formula to a value or filling an unrecovered part of the formula with a plurality of substitute characters.

7. The method of claim 1, wherein the safe load mode further comprises the steps of:
   initiating the opening of a corrupt file;
   repairing or removing parts of the file that are corrupt; and
   completing the opening of the file.

8. A method for loading filed into a spreadsheet application program operating on a computer system, using an automatically escalating load sequence, comprising the steps of:
   determining if a normal load mode failed while attempting to load the files in the spreadsheet application program;
   in response to determining that the normal load mode failed, automatically escalating the load sequence to a safe load mode in the spreadsheet application program, wherein a plurality of checks are performed and the files are repaired, wherein the plurality of checks include:
   workbook names;
   Active X controls;
   Visual Basic programs;
   macro viruses;
   record size;
   PivotTable report information;
   end of file markers; and
   invalid name ranges;
   determining if the safe load mode was successful in repairing and loading the files; and
   in response to determining that the safe load mode was unsuccessful, automatically escalating the load sequence to a data recovery mode in the spreadsheet application program, where the spreadsheet application program attempts to extract formulas and values from the file.

9. A method for repairing files and recovering data from corrupt files in an application program, the method comprising the steps of:
   determining if a first load mode failed while attempting to load the files into the application program; and
   in response to determining that the first load mode failed, automatically escalating a load sequence to a second load mode, wherein in escalating the load sequence to a second load mode,
   a check of Active X controls is performed,
   and the files are repaired.

10. A method for repairing files and recovering data from corrupt files in an application program, the method comprising the steps of:
    determining if a first load mode failed while attempting to load the files into the application program; and
    in response to determining that the first load mode failed, automatically escalating a load sequence to a second load mode, wherein in escalating the load sequence to a second load mode,
    a check of Visual Basic programs is performed,
    and the files are repaired.

11. A method for loading filed into a spreadsheet application program operating on a computer system, using an automatically escalating load sequence, comprising the steps of:
    determining if a normal load mode failed while attempting to load the files in the spreadsheet application program;
    in response to determining that the normal load mode failed, automatically escalating the load sequence to a safe load mode in the spreadsheet application program, wherein a plurality of checks are performed and the files are repaired, wherein the plurality of checks include:
    Active X controls,
    Visual Basic programs, and
    PivotTable report information;
    determining if the safe load mode was successful in repairing and loading the files; and
    in response to determining that the safe load mode was unsuccessful, escalating the load sequence to a data recovery mode in the spreadsheet application program, where the spreadsheet application program attempts to extract formulas and values from the file.

12. The method of claim 11, wherein the safe load mode comprises the steps of:
   initiating the opening of a corrupt file;
   conducting a plurality of consistency checks on the file during the opening of the file;
   repairing or removing parts of the file that are corrupt; and
   completing the opening of the file.

13. The method of claim 11, wherein the data recovery mode comprises reading a table of cell values and formulas.

14. The method of claim 13 further comprising the step of attempting to recover a formula in its entirety and if that is unsuccessful converting the formula to a value or filling an unrecovered part of the formula with a plurality of substitute characters.

15. The method of claim 11 further comprising the step of disabling a file if the data recovery mode is unsuccessful in opening the file.

16. A computer-readable media on which is stored a program for loading files into a spreadsheet application, the program comprising instructions that when executed perform the steps of:
   determining if a first load mode failed while attempting to load the files into the spreadsheet application; and
   in response to determining that the first load mode failed, automatically escalating a load sequence to a second load mode, wherein a plurality of checks are performed and the files are repaired, wherein the plurality of checks include:
   Active X controls,
   Visual Basic programs, and
   PivotTable report information.

17. The computer-readable medium as recited in claim 16, where in response to determining that the second load mode was unsuccessful in repairing and loading the files, the load sequence is escalated to a third recovery mode, where the spreadsheet application program attempts to extract formulas and values from the file.

18. The computer-readable medium as recited in claim 17, wherein the first load mode is a normal load mode, the second load mode is a safe load mode, and the third load mode is a data recovery mode.

19. The computer-readable medium as recited in claim 17, wherein the third load mode comprises reading a table of cell values and formulas.

20. The computer-readable medium as recited in claim 16, wherein the first load mode is a normal load mode and the second load mode is a safe load mode.

21. The computer-readable medium as recited in claim 16, wherein the first load mode is a normal load mode and the second load mode is a data recovery mode.

22. The computer-readable medium as recited in claim 16, wherein the second load mode comprises the steps of:
   initiating the opening of a corrupt file;
   conducting a plurality of consistency checks on the file during the opening of the file;
   repairing or removing parts of the file that are corrupt; and
   completing the opening of the file.

23. A method for repairing files and recovering data from corrupt files in an application program, the method comprising the steps of:
   determining if a first load mode failed while attempting to load the files into me application program; and
   in response to determining that the first load mode failed, automatically escalating a load sequence to a second load mode, wherein in escalating the load sequence to a second load mode,
   a check of PivotTable report information is performed, and the files are repaired.

* * * * *